UNITED STATES PATENT OFFICE.

FRITZ ULLMANN, OF FÜRTH, GERMANY, ASSIGNOR TO THE ACTIEN-GESELLSCHAFT FÜR ANILIN FABRIKATION, OF SAME PLACE.

YELLOW ACRIDINIUM DYE.

SPECIFICATION forming part of Letters Patent No. 643,569, dated February 13, 1900.

Application filed September 7, 1899. Serial No. 729,769. (Specimens.)

*To all whom it may concern:*

Be it known that I, FRITZ ULLMANN, of Fürth, in the Kingdom of Bavaria, German Empire, have invented new and useful Improvements in Acridinium Dyestuffs; and I do hereby declare that the following is a full, clear, and exact description of the invention, which will enable others skilled in the art to which it appertains to make and use the same.

My invention relates to the production of new coloring-matters from the so-called "acridin" dyestuffs.

As is well known, the dyestuffs belonging to the acridin series are characterized by the acridin group contained in them, as shown in the following formula for the typical acridin:

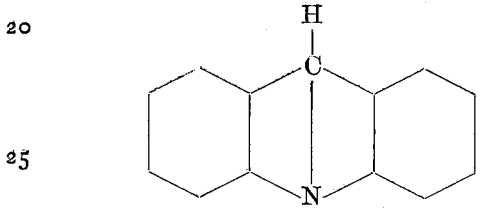

From this typical representative other acridin bases are derived by substituting for one or two of the benzene nuclei either homologous radicles or the naphthalene nucleus or by substituting for hydrogen in the CH group connecting the two nuclei a phenyl or substituted phenyl group. The acridin dyestuffs themselves are derivatives of these acridin bases containing in the hydrocarbon nuclei one or several amido groups, the hydrogen of which may again be substituted partly or totally by other radicles. All acridin dyestuffs are further characterized by the fact that their salts are easily decomposed by sodium carbonate, the free color base being precipitated. Owing to this behavior the shades obtained by means of acridin dyestuffs are not fast to alkalies.

It is now my invention to have found that acridin dyestuffs may be converted into new valuable coloring-matters which are fast to alkalies by the addition of alkyl to the nitrogen of the acridin radicle. The trivalent nitrogen by this treatment becomes pentavalent and products are formed which in analogy to the ammonium compounds may be termed "acridinium" compounds. Their constitution is represented by the following typical formula:

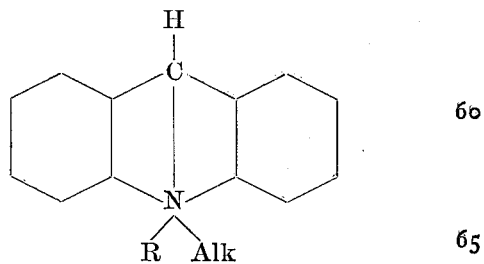

in which "Alk" represents an alkyl and R an acid radicle.

The acridinium dyestuffs are essentially distinguished from the acridin dyestuffs from which they are derived by the following properties: The salts of the acridinium dyestuffs are not decomposed by means of alkali carbonates. In consequence thereof the tints obtained with the acridinium dyestuffs are fast to alkalies. The acridinium dyestuffs further yield considerably clearer and more brilliant tints and their shades are more red or more orange than those obtained by the corresponding acridin dyes.

As regards the process of the alkylation of the acridins I have further found that dimethyl sulfate (or diethyl sulfate) is a most suitable agent for effecting the transformation of the acridin group into the acridinium group. If, for instance, the typical acridin is treated with dimethyl sulfate the reaction proceeds as shown in the following equation:

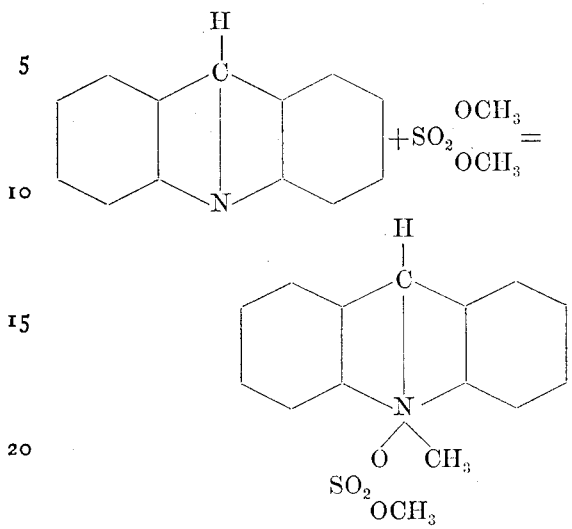

the methyl-sulfuric salt of the acridinium base being formed.

In order to indicate how my invention can practically be carried out, I give in the following example a description of the manufacture of an acridinium dyestuff from the amidotolunaphthacridin described in English Patent No. 16,474, 1898.

Two parts, by weight, of amidotolunaphthacridin (English Patent No. 16,474, 1898) are dissolved in the heat in twenty parts of nitrobenzene, and to the boiling solution is added one part of dimethyl sulfate. The new acridinium compound separates at once in the form of the pure methyl-sulfuric salt. The dyestuff thus obtained forms a brown-red powder easily soluble in water with red color. The aqueous solution is not altered by addition of ammonia or sodium carbonate; but on addition of caustic-soda lye the free color base is separated in shape of a red precipitate soluble in ether with red color and green fluorescence.

The dyestuff dyes tannin-mordanted cotton clear orange-yellow shades.

In quite the same manner as shown in the above typical example and with practically the same result other acridin dyes may be converted into the corresponding acridinium derivatives by means of dimethyl sulfate. Thus, for instance, my new process may be applied to coloring-matters such as acridin-yellow, acridin-orange, benzoflavine, and the like. The resulting coloring-matters closely resemble the dyestuff described in the above example.

Having now described my invention and in what manner the same can be performed, what I claim as new is—

1. A new dye derived from the acridin series, which can be obtained as a methyl-sulfuric salt by treating an acridin dyestuff with dymethyl sulfate, this new dye being the salt of an amido derivative of the typical acridinium:

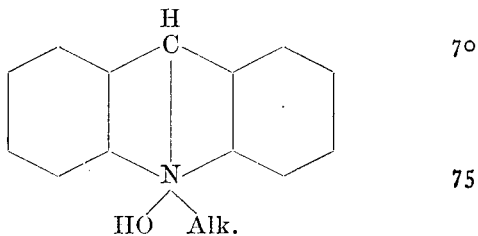

in which formula "Alk" represents an alkyl and in which the two benzene nuclei may one or both be replaced by homologous groups or by the naphthalene nucleus, the salt of the new acridinium color-base being not decomposed by sodium carbonate or ammonia, the free base only being precipitated by means of caustic alkalies the salt forming a yellow or red powder readily soluble in water with yellow color and bitter taste, the new dyestuff dyeing tannin-mordanted cotton orange-yellow shades.

2. As a specific dye the dyestuff obtained as a methyl-sulfuric salt by treating amidotolunaphthacridin with dimethyl sulfate, the methyl-sulfuric salt formed being represented by the formula:

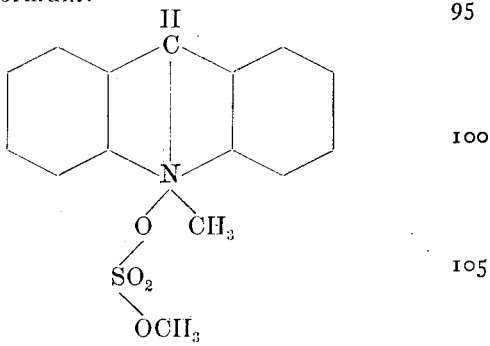

forming a brown-red powder easily soluble in water with yellow color, the solution being not altered by sodium carbonate or ammonia, but being precipitated by means of caustic alkalies, the free color bases thus separating in form of a red precipitate soluble in ether with red color and green fluorescence, the new dyestuff dyeing tannin-mordanted cotton clear orange-yellow shades.

In witness whereof I have hereunto signed my name, this 24th day of August, 1899, in the presence of two subscribing witnesses.

FRITZ ULLMANN.

Witnesses:
  FRITZ ULLMANN,
  OSCAR BOCK.